Figure 1:
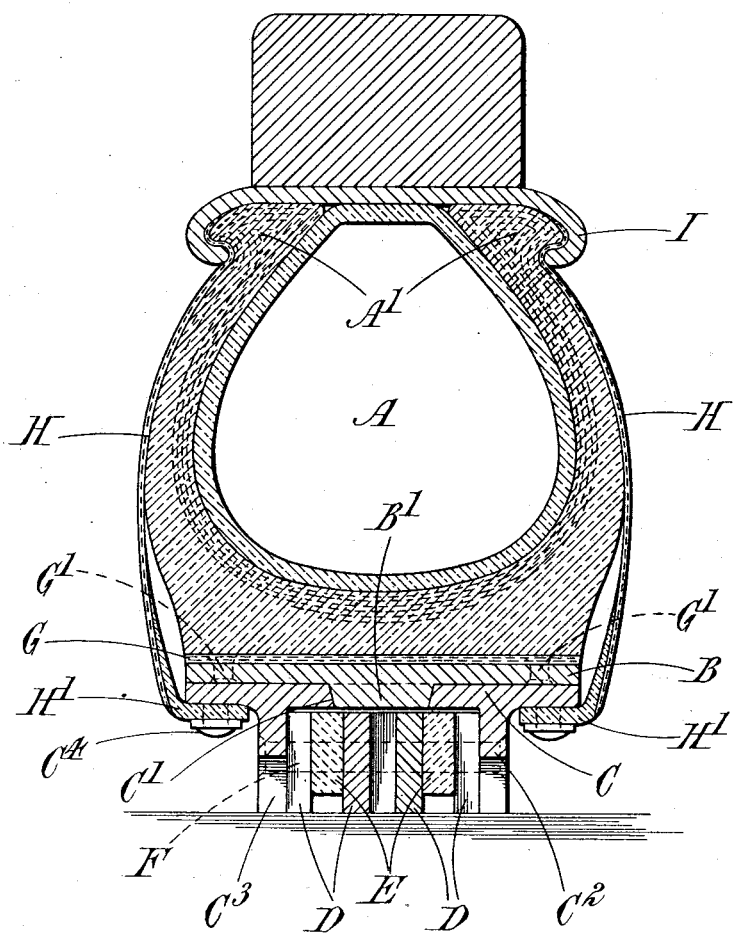

J. C. BERRY.
TREAD BAND FOR TIRES OF MOTOR VEHICLES.
APPLICATION FILED OCT. 14, 1910.

1,052,560.

Patented Feb. 11, 1913.
3 SHEETS—SHEET 1.

Witnesses:
Thomas Durant
Halbert P. Brown

Inventor
John Carter Berry.
by Church & Church
per J. B. Church
his attys

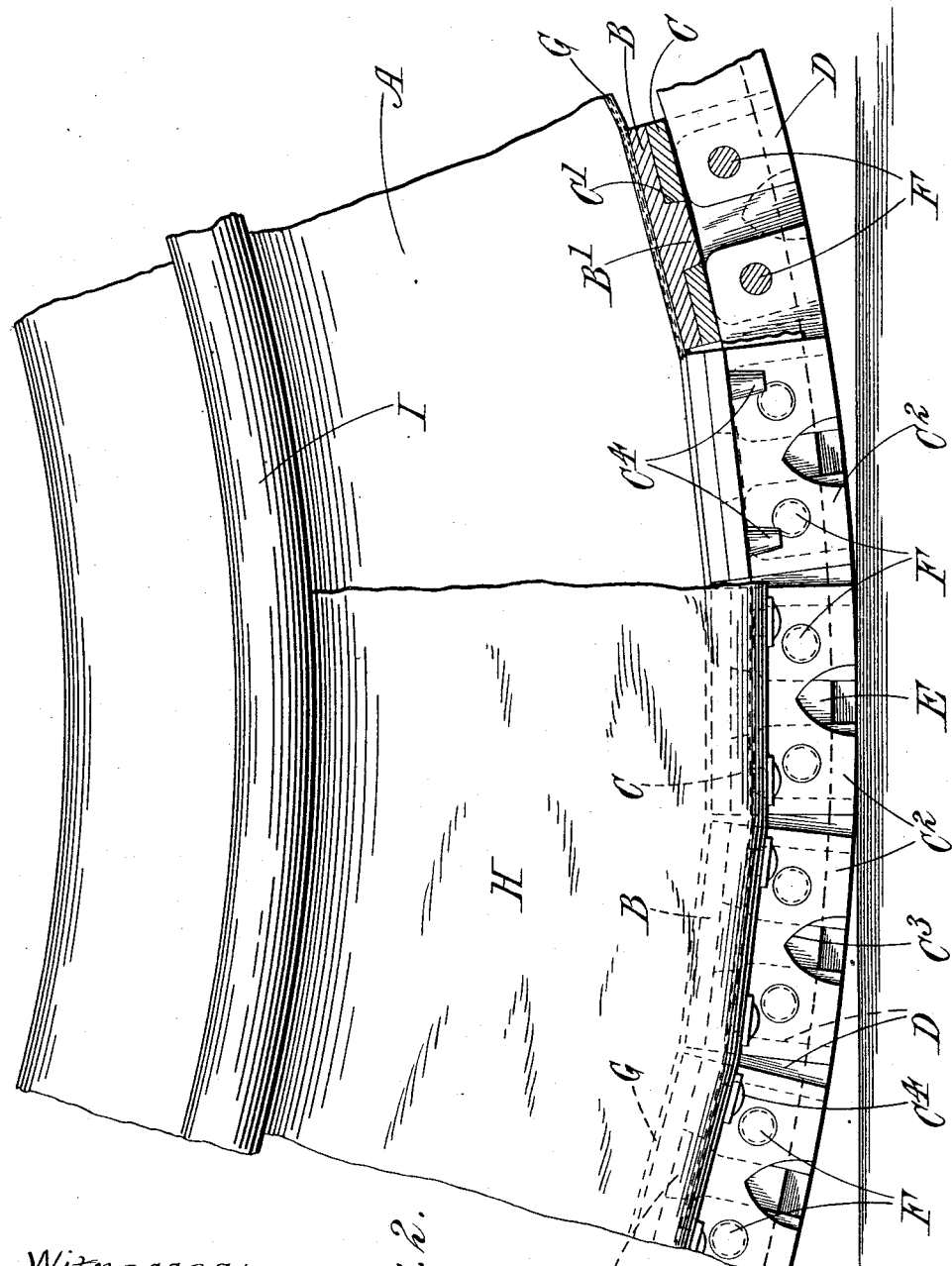

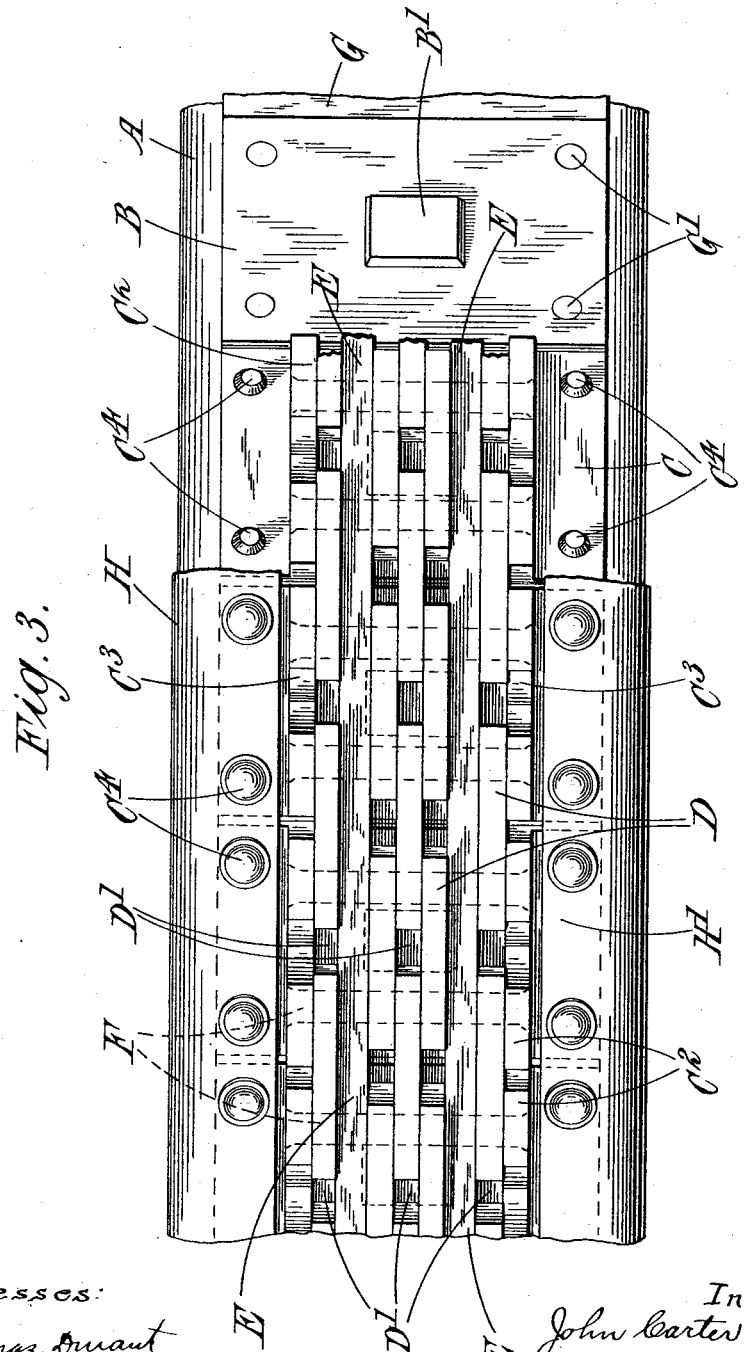

UNITED STATES PATENT OFFICE.

JOHN CARTER BERRY, OF HARROW, ENGLAND.

TREAD-BAND FOR TIRES OF MOTOR-VEHICLES.

1,052,560. Specification of Letters Patent. Patented Feb. 11, 1913.

Application filed October 14, 1910. Serial No. 587,101.

*To all whom it may concern:*

Be it known that I, JOHN CARTER BERRY, a subject of the King of England, residing at Harrow, Middlesex, England, have invented certain new and useful Improvements in Tread-Bands for the Tires of Motor-Vehicles, of which the following is a specification.

This invention relates to improvements in the tread bands of motor vehicles the band being designed to prevent puncture when applied to a pneumatic tire and to prevent side slip in all cases.

The invention has particular relation to the construction of the band itself and the means by which it is secured to the tire and will be best understood by reference to the accompanying drawings, in which—

Figure 1 is a cross section through a pneumatic tire and the band. Fig. 2 is a side elevation of tire and band partly in section and Fig. 3 is a face or tread view of the band, parts being broken away and removed to show underlying parts.

Like letters indicate like parts throughout the drawings.

A represents the tire which in this case is an ordinary pneumatic tire with a square or flat tread. B are plates arranged transversely across the tire and provided with projecting portions $B^1$ or equivalent devices by which other members of the band are prevented from slipping or creeping upon B.

C are transverse plates lying upon B and recessed at $C^1$ to receive the projections $B^1$ as shown in Figs. 1 and 2. The plates C have flanges $C^2$ recessed as at $C^3$ so as to facilitate the penetration of the flanges $C^2$ through mud etc. to obtain a firm hold upon the solid ground.

D are links of a steel chain or chain-like device preferably hardened and presenting a substantially flat surface to the road except for the spaces $D^1$ between the links.

E are leather strips or links placed between two contiguous rows of links or runs of the chain-like device to soften the contact, deaden the sound and provide a good bearing for so much of the road surface as penetrates to them between the steel links. It will be noticed that the leather strips or links E are not carried down so far as the wearing surface of the links D so that while they assist in gripping the road, they will be somewhat protected by the steel links; also this arrangement provides peripheral grooves or recesses to receive the road surface and especially mud and to assist in preventing side slip.

The precise number of runs or rows of links and of strips or links of leather and their relative positions may be varied but in the arrangement shown in the drawing, three contiguous runs of links are shown in the center, then two strips of leather, then two outside runs of links and lastly the flanges $C^2$ of the plates C.

Transverse hinge pins, bolts or rivets F extend through both flanges $C^2$ and all the runs of the links D and the leather strips, thus binding them all securely together while allowing the necessary freedom of movement.

The plates B are all secured upon a strip G of flexible material say, for example, canvas and rubber, in one or more layers in any appropriate manner, as by rivets $G^1$ and this canvas band is intended merely to engage with the tread of the tire A, but in the case of new tires made expressly for these non-slip bands, the canvas strip G and plates B may be vulcanized to the tire itself.

The plates C have rivets $C^4$ preferably cast upon them, over which fits the edges of two circular strips of rubber-covered canvas, leather or similarly appropriate flexible material H which extend over the sides of the tire to which they are secured by solutioning, vulcanizing, or the like, the strips extending far enough on each side to partly surround the beads $A^1$ of the tire so that the inner edges of H are gripped between the beads of the tire and the inturned edges of the wheel rim I. The portion $H^1$ of H which is likely to receive most damage from the wet and dirt of the road is preferably made thicker than the rest of it, as shown in Fig. 1 of the drawings. By making the bands H complete circles, they serve to protect the tire from the attacks of wet and dirt.

In the case of a solid tire the construction of the band would be the same and the attachment substantially the same subject to such slight variation as might be found necessary in practice in consequence of the non-inflatable character of the tire.

What I claim as my invention and desire to secure by Letters Patent is:—

1. A tread for road wheels of vehicles comprising in combination, a base-plate, B, projections from the base-plate $B^1$, a channeled-member C having holes C¹ to engage the projections B¹, a series of links D disposed in the channel and presenting surfaces to contact with a track and transverse rods F for holding the links in the channeled-member.

2. A tread for road wheels of vehicles comprising in combination, a base-plate B, projections from the base-plate B¹, a channeled-member C having holes C¹ to engage the projections B¹, a series of links D disposed in the channel and presenting surfaces to contact with a track, leather strips interposed between two adjacent runs of links and transverse rods F for holding the links in the channeled-member.

In testimony whereof I have signed my name to this specification in the presence of two subscribing witnesses.

JOHN CARTER BERRY.

Witnesses:
HARRY B. BRIDGE,
PERCY HEWITT.

Copies of this patent may be obtained for five cents each, by addressing the "Commissioner of Patents, Washington, D. C."